United States Patent
Royer

(10) Patent No.: US 10,010,063 B2
(45) Date of Patent: Jul. 3, 2018

(54) IMITATION FISH EGGS

(71) Applicant: Michael J Royer, Irasburg, VT (US)

(72) Inventor: Michael J Royer, Irasburg, VT (US)

(73) Assignee: Michael J. Royer, Irasburg, VT (US)

( * ) Notice: Subject to any disclaimer, the term of this patent is extended or adjusted under 35 U.S.C. 154(b) by 0 days.

(21) Appl. No.: 15/281,868

(22) Filed: Sep. 30, 2016

(65) Prior Publication Data
US 2017/0013820 A1    Jan. 19, 2017

Related U.S. Application Data

(62) Division of application No. 14/170,620, filed on Feb. 2, 2014.

(51) Int. Cl.
*A01K 85/00* (2006.01)
*A01K 97/04* (2006.01)

(52) U.S. Cl.
CPC ............ *A01K 97/045* (2013.01); *A01K 85/00* (2013.01)

(58) Field of Classification Search
CPC ..................................................... A01K 85/00
USPC ............................. 43/42, 42.36, 42.37, 42.53
See application file for complete search history.

(56) References Cited

U.S. PATENT DOCUMENTS

| | | | | |
|---|---|---|---|---|
| 825,232 A * | 7/1906 | Mitchell | ................ | A01K 85/00 43/42.34 |
| 2,827,376 A * | 3/1958 | Breuer | ................ | A01K 97/045 426/1 |
| 3,421,899 A * | 1/1969 | Humphreys | ......... | A01K 97/045 426/1 |
| 3,579,895 A * | 5/1971 | Orn | ........................ | A01K 85/00 156/309.9 |
| 3,684,519 A * | 8/1972 | Combs | .................... | A23K 50/80 426/1 |
| 3,875,302 A * | 4/1975 | Inoue | ..................... | A01C 21/00 426/1 |
| D237,612 S * | 11/1975 | Maxwell | ........................ | 43/17.6 |
| 4,251,547 A * | 2/1981 | Liggett | ................. | A01K 97/045 426/1 |
| 4,887,376 A * | 12/1989 | Sibley | .................... | A01K 85/01 426/1 |
| 7,174,670 B2 * | 2/2007 | Lizardo | .................. | A01K 85/00 43/42.24 |
| 2003/0233781 A1* | 12/2003 | Pezzente | ................. | A01K 97/04 43/42 |
| 2008/0190009 A1* | 8/2008 | Shelton | .................. | A01K 85/00 43/42.06 |

* cited by examiner

*Primary Examiner* — David J Parsley
(74) *Attorney, Agent, or Firm* — Shawn Gordon; Dunkiel Saunders Elliott; Raubvogel & Hand, PLLC

(57) ABSTRACT

A method of preparing imitation fish eggs is provided wherein granules of cross-linked polyacrylamide are hydrated to form globules that can be placed in netting that is twisted and tied to form imitation egg sacs. The egg sacs can then be attached to a fishing hook and used for bait. The globules can be made any desired color by including food coloring or other suitable dye.

4 Claims, 1 Drawing Sheet

US 10,010,063 B2

IMITATION FISH EGGS

CROSS-REFERENCE TO RELATED APPLICATIONS

This application is a divisional of and claims the benefit of U.S. patent application Ser. No. 14/170,620 titled "Imitation Fish Eggs" and filed Feb. 2, 2014.

STATEMENT REGARDING FEDERALLY SPONSORED RESEARCH OR DEVELOPMENT

Not applicable.

FIELD OF THE INVENTION

This invention relates to artificial fishing lures and bait.

BACKGROUND OF THE INVENTION

Fish eggs, and specifically clusters of fish eggs known as egg sacs, roe bags, or spawn bags, are known to be good bait for catching freshwater game fish. Harvested natural fish eggs are often used as bait and can be tied in fine netting to form egg sacs. However, many locations do not allow the use of natural fish eggs due to the risk of spreading diseases and/or unwanted species to the lakes, rivers and streams being fished. In addition, natural fish eggs have a relatively short shelf life. Therefore, artificial or imitation fish eggs have been developed. These are often made of rubber or soft plastic materials. However, imitation eggs of these materials may be indigestible to fish and can harm them if swallowed. (Many people who fish follow catch and release policies and in many locations such policies are required.) Therefore, what is needed is a simulated egg bait that is effective at attracting fish strikes, less harmful to fish if ingested, and environmentally benign.

SUMMARY OF THE INVENTION

An object of the present invention is to provide a method of preparing an imitation egg sac formed with netting containing globules of hydrated cross-linked polyacrylamide.

It is a further object of the invention to provide the imitation egg sacs in a variety of colors and sizes.

DETAILED DESCRIPTION OF PREFERRED EMBODIMENTS

The improved imitation fish egg bait of the present invention can be prepared using appropriately sized water absorbing granules such as cross-linked polyacrylamide granules. Granules that can be used in the present invention may be obtained, for example, from JRM Chemical Inc. of Cleveland, Ohio, which sells a product known as SoilMoist Granules. Any amount can be prepared but for a single fishing expedition one teaspoon of granules would generally be more than sufficient. Water is added to the teaspoon of granules and allowed to be absorbed until the granules have expanded to become roughly fish egg sized globules, which may take about an hour. In addition, preferably, a non-toxic dye such as food coloring may be mixed with the water prior to combining with the granules such that the globules when formed will have an appropriate hue, for instance giving the globules a translucent reddish-pink, yellow or orange appearance.

Figure 1:
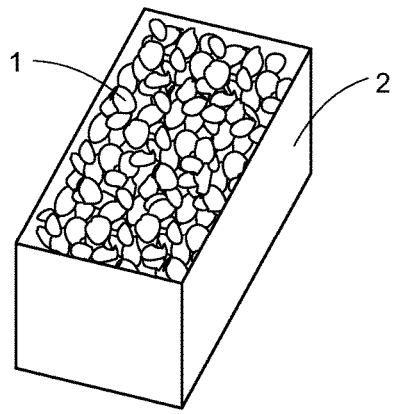
FIG. 1 depicts a collection of globules.
Figure 2:
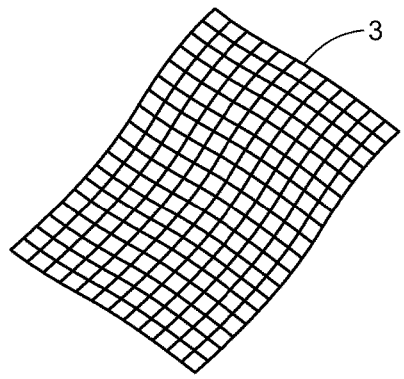
FIG. 2 depicts prior art fine netting.
Figure 3:
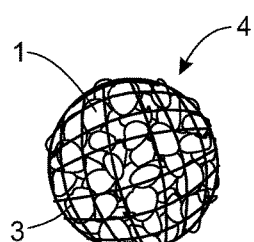
FIG. 3 depicts an imitation egg sac of the present invention.

Once the globules 1 as seen in FIG. 1 are formed they can be placed in a suitable container, such as a hard plastic container 2, and stored for several weeks or months, preferably in a refrigerator. When ready to use, a small number of globules 1, anywhere from a few up to thirty or more, can be placed on a piece of egg spawn netting 3, which can be found in any of a variety of bait shops, stores and websites. The netting is then drawn into a ball by putting the edges together and twisted until the globules are squeezed together inside the netting, at which point the netting is tied using string, thread or other suitable securing technique to form an imitation egg sac 4.

Figure 4:
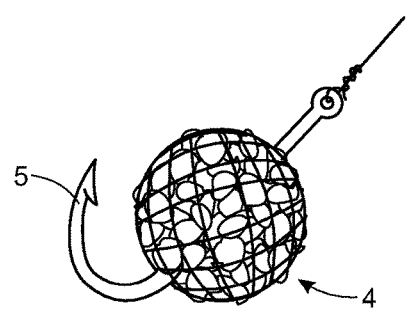
FIG. 4 depicts an imitation egg sac of the present invention attached to a fishing hook.

The imitation egg sac 4 can be stored or used immediately. In use, the egg sac 4 is placed onto a fishing hook 5 as shown in FIG. 4. The imitation egg sac can be placed on any manner or variety of fish hooks, including treble hooks, lures and jigs. When a fish strikes the imitation egg sac 4 of the present invention, the globules 1 may disperse out of the spawn netting 3 and/or break into smaller pieces, which may tend to be passed more easily by a fish if swallowed.

The invention claimed is:

1. A method for preparing an imitation egg sac for fishing, the steps consisting of:
  adding a sufficient amount of water to cross-linked polyacrylamide granules to form gel-like globules;
  placing the globules on netting;
  twisting the netting with the globules in the netting until the globules are squeezed together such that at least some of the globules partially extrude through the netting and the globules collectively resemble a ball of fish eggs and such that when a fish strikes the netting containing the squeezed globules at least some of the globules will break into smaller pieces and disperse out of the netting;
  tying the netting to secure the globules in the netting in the squeezed and extruded condition; and
  skewering the secured globules in the netting on a fish hook, the fish hook comprising an elongated shank and a curved portion extending from the elongated shank, the globules in the netting secured on the elongated shank with the curved portion of the hook extending outwardly from globules in the netting.

2. The method of claim 1 further including the step of:
  adding dye to the water.

3. A method of preparing fish bait on a fish hook, the steps consisting of:
  hydrating a plurality of cross-linked polyacrylamide granules that are sized in order to resemble fish eggs when the plurality of hydrated granules are squeezed together in spawn netting such that at least some of the plurality of hydrated granules partially extrude through the spawn netting and the plurality of squeezed, hydrated granules resemble a glob of fish eggs;
  securing the plurality of hydrated granules in the spawn netting sufficiently tightly such that the plurality of squeezed, hydrated granules in the spawn netting continue to resemble a glob of fish eggs, wherein when a fish strikes the secured spawn netting containing the squeezed, hydrated granules, at least some of the hydrated granules will break into smaller pieces and disperse out of the netting; and skewering the hydrated granules in the spawn netting on the fish hook, the fish hook comprising an elongated shank and a curved portion extending from the elongated shank, the hydrated granules in the spawn netting secured on the elongated shank with the curved portion of the hook extending outwardly from hydrated granules in the spawn netting.

4. A fishing bait and hook assembly consisting of:

at least thirty hydrated cross-linked polyacrylamide granules;

netting, wherein the hydrated granules are in the netting and sized such that when the netting is twisted sufficiently tightly the hydrated granules are squeezed together by the netting and each other such that at least some of the hydrated granules partially extrude from the netting and such that collectively the squeezed, hydrated granules resemble a ball of fish eggs and wherein the hydrated granules are sized and configured such that when a fish strikes the netting containing the squeezed, hydrated granules, at least some of the hydrated granules will break into smaller pieces and disperse out of the netting; and a fish hook, the fish hook comprising an elongated shank and a curved portion extending from the elongated shank, wherein the hydrated granules in the netting are secured on the elongated shank with the curved portion of the hook extending outwardly from hydrated granules in the netting.

\* \* \* \* \*